United States Patent

Mahlich

[11] Patent Number: 5,785,256
[45] Date of Patent: Jul. 28, 1998

[54] STEAM NOZZLE FOR ESPRESSO MACHINES

[75] Inventor: Gotthard Mahlich, Kronberg, Germany

[73] Assignee: Eugster/Frismag AG, Romanshorn, Switzerland

[21] Appl. No.: 600,506

[22] Filed: Feb. 13, 1996

[30] Foreign Application Priority Data

Feb. 17, 1995 [DE] Germany ............ 295 02 592 U

[51] Int. Cl.[6] ............................................. B05B 1/14
[52] U.S. Cl. ................... 239/552; 239/553.5; 239/590.5
[58] Field of Search ...................... 239/548, 552, 239/553.5, 590.5, 601, 553, 553.3, 590, 590.3; 99/454

[56] References Cited

U.S. PATENT DOCUMENTS

| | | | |
|---|---|---|---|
| 3,337,204 | 8/1967 | Gigantion et al. | 239/548 |
| 3,338,570 | 8/1967 | Zimmer | 239/548 |
| 4,119,160 | 10/1978 | Summers et al. | 239/548 |
| 4,735,133 | 4/1988 | Paoletti | 99/454 |
| 5,080,286 | 1/1992 | Morrison | 239/533.13 |

FOREIGN PATENT DOCUMENTS

| | | |
|---|---|---|
| 0 344 859 | 12/1989 | European Pat. Off. . |
| 0 509 505 | 10/1992 | European Pat. Off. . |
| 2 701 373 | 8/1994 | France . |
| 502 826 | 7/1930 | Germany . |

Primary Examiner—Andres Kashnikow
Assistant Examiner—Lisa Ann Douglas
Attorney, Agent, or Firm—Spencer & Frank

[57] ABSTRACT

A steam tube assembly for an espresso making machine includes a steam tube having a longitudinal axis and an outlet end; and a nozzle head attached to the steam tube at the outlet end. The nozzle head has a plurality of nozzle bores distributed in a circular array. Each nozzle bore has an inlet in communication with the outlet end of the steam tube and an outlet through which steam flowing in the steam tube is discharged. The nozzle bores diverge from one another as viewed from the inlet toward the outlet thereof and form an acute angle with the longitudinal axis of the steam tube.

6 Claims, 1 Drawing Sheet

STEAM NOZZLE FOR ESPRESSO MACHINES

CROSS REFERENCE TO RELATED APPLICATION

This application claims the priority of German Utility Model Application No. 295 02 592.1 filed Feb. 17, 1995, which is incorporated herein by reference.

BACKGROUND OF THE INVENTION

This invention relates to a steam nozzle for espresso machines and is of the type which has a steam tube having a bottom outlet.

Known espresso machines of the above-outlined type are provided with a steam outlet tube for the purpose of heating liquids and for preparing milk foam for cappuccino coffee. A nozzle is arranged at the outlet of the tube for the purpose of increasing the steam velocity. The nozzle is, dependent upon the manufacturer, designed as a nozzle having a compression portion and an expansion portion or as a simple cross-sectional constriction provided in the steam tube.

For heating liquids, the outlet nozzle is submerged underneath the surface of a liquid contained in a vessel and hot steam is introduced into the liquid.

For preparing milk foam, the nozzle is manually guided along the surface of the milk contained in the vessel in such a manner that a three-phase boundary of steam-milk-air is obtained which leads to the generation of milk foam.

Hot beverages from instant powders may also be prepared by means of a steam nozzle of the above-outlined type. For such purpose, either the liquid in the vessel is mixed with the instant powder and thereafter heated by means of the steam introduced into the liquid or the steam jet is introduced into the vessel in which the instant powder is located and into which no liquid has been added. The steam condenses and mixes with the instant powder, whereby the desired beverage is obtained.

Steam nozzles of conventional structure have only a sole steam outlet nozzle which is oriented axially to the flow direction in the steam tube and which directs the exiting steam jet only in an axial direction onto the instant-powder mound when a beverage is to be prepared. This arrangement, however, has the disadvantage that only a relatively small region of the instant powder is impinged upon by the steam jet which leads to a crater formation in the powder mound and to a clump formation along that region of the powder mound which is situated in the edge zones of the along the edge zones of the steam cone.

SUMMARY OF THE INVENTION

It is an object of the invention to provide an improved steam nozzle of the above-outlined type with which hot beverages may be prepared from instant powder without the formation of a crater by the steam jet in the powder mound to be dissolved in the liquid and without leading to a lump formation of the powder in the edge zones of the steam cone.

This object and others to become apparent as the specification progresses, are accomplished by the invention, according to which, briefly stated, the steam tube assembly for an espresso making machine includes a steam tube having a longitudinal axis and an outlet end; and a nozzle head attached to the steam tube at the outlet end. The nozzle head has a plurality of nozzle bores distributed in a circular array. Each nozzle bore has an inlet in communication with the outlet end of the steam tube and an outlet through which steam flowing in the steam tube is discharged. The nozzle bores diverge from one another as viewed from the inlet toward the outlet thereof and form an acute angle with the longitudinal axis of the steam tube.

The steam nozzle according to the invention avoids the disadvantages of the conventional constructions and makes possible a uniform exposure of the powder to the steam and a lump-free dissolution of the instant powder. Stated differently, by the distributed nozzle arrangement a uniform, lump-free mixing of the instant powder is achieved. Preferably, the nozzle bores have identical cross sections and are uniformly circularly distributed in the nozzle head and extend at an acute angle to the axis of the steam tube or the nozzle head.

Tests have shown that it is particularly advantageous to provide five bores oriented at an angle of between 15° and 45° to the steam tube axis, dependent upon the steam generator used.

For steam generators of small output, it is of advantage to provide, in addition to the obliquely extending bores, a centrally located axial bore having a lesser cross-sectional area than that of the oblique bores.

The sum of the cross-sectional areas of all nozzle bores should not exceed one-fifth of the cross-sectional area of the steam tube to avoid an excessive pressure loss.

DESCRIPTION OF THE PREFERRED EMBODIMENTS

Figure 1:
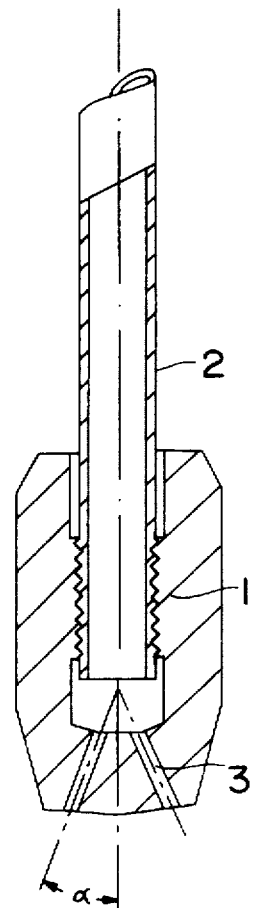
FIG. 1 is an axial sectional view of a preferred embodiment of the invention.
Figure 2:
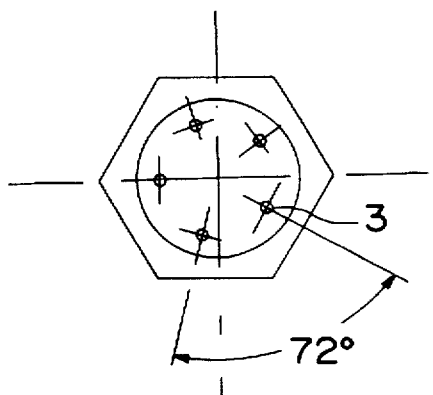
FIG. 2 is a bottom plan view of the structure shown in FIG. 1.

The embodiment illustrated in FIGS. 1 and 2 has a nozzle head 1 which is screwed on a lower terminal portion of a steam tube 2 of an otherwise not-illustrated hot beverage making device. The nozzle head 1 is in axial alignment with the longitudinal central axis A of the steam tube 2.

The nozzle head 1 is provided with five nozzle bores 3 which are circumferentially uniformly distributed. The nozzle bores 3 are oriented at an angle α to the central axis A as shown in FIG. 1. Thus, the nozzle bores 3 may be considered as lying on a conical surface that converges into a point in the inside of the nozzle head 1.

Figure 3:
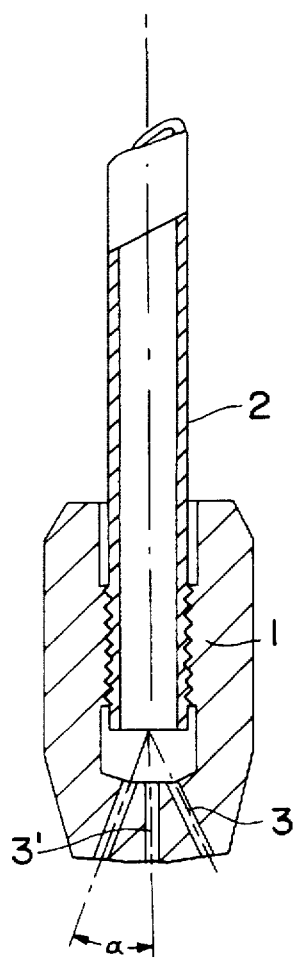
FIG. 3 is an axial sectional view of another preferred embodiment of the invention.

In another embodiment of the invention illustrated in FIG. 3, an additional central nozzle bore 3' is provided having an axis which defines the direction of flow through the nozzle bore 3' and which is in alignment with the central steam tube axis A. The cross-sectional passage area of the central nozzle bore 3' is less than that of any of the other nozzle bores 3. This embodiment is particularly advantageous in case the beverage making machine operates with a steam generator of small power.

It will be understood that the above description of the present invention is susceptible to various modifications, changes and adaptations, and the same are intended to be comprehended within the meaning and range of equivalents of the appended claims.

What is claimed is:

1. A steam tube assembly for a machine for preparing a hot drink from instant powder, comprising (a) a steam tube having a longitudinal axis and an outlet end; and (b) a separate nozzle head attached to said steam tube at said outlet end; said nozzle head having a plurality of nozzle bores distributed in a circular array; each said nozzle bore having an inlet being in communication with said outlet end of said steam tube and an outlet through which steam flowing in said steam tube is discharged in a flow path; said assembly being void of any structural obstruction in said flow path downstream of said outlet of each said nozzle bore as viewed in direction of steam flow therethrough; said nozzle bores diverging from one another as viewed from the inlet toward the outlet thereof and forming an acute angle with said longitudinal axis for uniformly exposing the instant powder to steam to effect a lump-free dissolution of the instant powder; said nozzle head having an additional nozzle bore having a nozzle axis defining a direction of flow through said additional nozzle bore; said nozzle axis being coaxial with said longitudinal axis.

2. The steam tube assembly as defined in claim 1, wherein said nozzle bores are uniformly distributed.

3. The steam tube assembly as defined in claim 1, wherein said acute angle is approximately between 15° and 45°.

4. The steam tube assembly as defined in claim 1, wherein the sum of cross-sectional passage areas of said nozzle bores is at the most one fifth of a cross-sectional passage area of said steam tube.

5. The steam tube assembly as defined in claim 1, wherein said nozzle bores have identical cross sections.

6. A steam tube assembly for a machine for preparing a hot drink from instant powder, comprising (a) a steam tube having a longitudinal axis and an outlet end; and (b) a separate nozzle head attached to said steam tube at said outlet end; said nozzle head having a plurality of first nozzle bores distributed in a circular array; each said nozzle bore having an inlet being in communication with said outlet end of said steam tube and an outlet through which steam flowing in said steam tube is discharged in a flow path; said assembly being void of any structural obstruction in said flow path downstream of said outlet of each said nozzle bore as viewed in direction of steam flow therethrough; said nozzle bores diverging from one another as viewed from the inlet toward the outlet thereof and forming an acute angle with said longitudinal axis for uniformly exposing the instant powder to steam to effect a lump-free dissolution of the instant powder; said nozzle head further comprising a second nozzle bore having a nozzle axis defining a direction of flow through said additional nozzle bore; said nozzle axis being coaxial with said longitudinal axis; said second nozzle bore having a cross-sectional passage area less than a cross-sectional passage area of any of said first nozzle bores.

\* \* \* \* \*